Patented Feb. 28, 1933

1,899,512

UNITED STATES PATENT OFFICE

ADOLF LEWINSON, OF BERLIN-CHARLOTTENBURG, GERMANY

PROCESS FOR MAKING ALCOHOL-WEAK BEVERAGES

No Drawing. Application filed August 8, 1930, Serial No. 474,065, and in Germany September 9, 1929.

The invention relates to a process for making alcohol-weak, carbon dioxide containing beverages by fermentation, in which the carbon dioxide is produced in the liquid itself and is closely bound therein.

This is effected according to this invention by the alcoholic fermentation of sugar containing solutions being so checked by the addition of fermentation checking raw materials that the beverages can be stored without considerable alcohol formation. Cranberries (Vaccinium oxycoccus) which, as is known, occur in northern countries particularly Siberia, in crushed condition, or the extract therefrom, have been found particularly suitable as the raw fermentation checking substance.

By adding the cranberries the fermentation is so checked that an intensive relatively short period fermentation takes place which however ceases with a still high content of fermentable sugar, or in other words is so checked that after many days' storage a beverage is obtained which is weak in alcohol and still contains considerable fermentable sugar.

In this way an alcohol-weak agreeable beverage containing carbon dioxide of fermentation and sugar and rendered aromatic by the cranberries is obtained, which even if not pasteurized when bottled, will keep for long periods owing to the preservative action of the cranberries. It appears that the surprising fermentation checking action of this raw material upon which the preparation of the beverage according to this invention is based, must be ascribed to the preserving action of certain constituents of the cranberries.

Since the fermentation is greatly and unexpectedly checked it is possible for the beverage to undergo the process known as ageing, only after which the beverage becomes satisfactory in taste and agreeable, without so much alcohol being formed that the beverage from being weak in alcohol becomes strong in alcohol. With the passage of the ageing period therefore, the formation of alcohol does not take place to an undesirable degree.

Advantageously slow fermenting, in particular top fermentation, yeast is used, the main fermentation being effected in open vats and the secondary fermentation preferably in closed containers, for example in the bottles themselves, whereby the checking of the fermentation is increased.

The following is an example which will illustrate the process.

The sap obtained by pressing 1,000 gms. of cranberries is diluted to 7,000 gms. with water and refined sugar added to form a 10% solution.

The solution is fermented at room temperature with press yeast, bottled after two days' fermentation in open vessels, and stored after sealing.

After five days' storage from the start the liquid contains a satisfactory amount of carbon dioxide and is entirely suitable for drinking, while the alcohol content is 0.75%.

After 29 days' storage the alcohol content is 1.03%. It is pointed out that this particular example yields a beverage which is not permissible under the laws of the United States now in force.

Before bottling the beverage can be filtered.

If the secondary fermentation is effected in large closed containers, before being filled into vessels for retailing, for which for example siphons can be used, it may be filtered, after which filling takes place preferably under counter pressure.

If weaker solutions are employed than in the above example, then the alcohol content will be lower than in the above example.

After fermentation the sweetness of the beverage can be adjusted by adding sugar solution. The addition of aromatic substances for example vanilla may be desirable in some cases.

In contradistinction to known processes, the fermentation leading to an alcohol-weak beverage is controlled not by the choice of the ferment, but in a very simple manner by the addition of a special raw material which ensures an extreme constancy of the degree of fermentation and thereby of the final product. Thus by adding only sufficient sugar in the above example to give an 8% solution, fermentating for 12 hours and after fermenting for 60 hours, and filtering and bottling under counter pressure after 72 hours an alcohol content from 0.35 to 0.4%, which does not increase, is obtained.

What I claim is:—

1. A process for making an alcohol-weak beverage by fermentation accompanied by the formation of carbon dioxide which consists in adding material containing the sap of cranberries to a solution containing sugar and then fermenting said solution, the proportion of material containing the sap of cranberries being sufficient to check the fermentation of said solution so that it may be stored without becoming undesirably alcoholic.

2. A process for making a beverage containing carbon dioxide which consists in adding material containing the sap of cranberries to a solution containing sugar, and then fermenting said solution in closed containers, the proportion of material containing the sap of cranberries being sufficient to check the fermentation of said solution so that it may be stored without becoming undesirably alcoholic.

3. A process for making a beverage containing carbon dioxide which consists in adding material containing the juice of cranberries to a solution containing sugar, fermenting said solution in closed vessels, then filtering said solution, and then filling the beverage under counter pressure into containers for transport, the proportion of material containing the juice of cranberries being sufficient to check the fermentation of said solution so that it may be stored without becoming undesirably alcoholic.

4. A process for making a beverage containing carbon dioxide which consists in adding crushed cranberries to a solution containing sugar, and fermenting said solution, the proportion of crushed cranberries being sufficient to check the fermentation of said solution so that it may be stored without the alcohol content rising above the desirable limit.

5. A process for making a beverage containing carbon dioxide which consists in adding cranberry extract to a solution containing sugar, and fermenting said solution, the proportion of cranberry extract being sufficient to check the fermentation of said solution so that it may be stored without the alcohol content rising above the desirable limit.

In testimony whereof I have signed my name to this specification.

ADOLF LEWINSON.